United States Patent
Kamilov et al.

(10) Patent No.: US 10,582,121 B2
(45) Date of Patent: Mar. 3, 2020

(54) SYSTEM AND METHOD FOR FUSING OUTPUTS OF SENSORS HAVING DIFFERENT RESOLUTIONS

(71) Applicant: Mitsubishi Electric Research Laboratories, Inc., Cambridge, MA (US)

(72) Inventors: Ulugbek Kamilov, Cambridge, MA (US); Juan Castorena, El Paso, TX (US); Petros Boufounos, Arlington, MA (US)

(*) Notice: Subject to any disclaimer, the term of this patent is extended or adjusted under 35 U.S.C. 154(b) by 204 days.

(21) Appl. No.: 14/993,307

(22) Filed: Jan. 12, 2016

(65) Prior Publication Data
US 2017/0200273 A1    Jul. 13, 2017

(51) Int. Cl.
*H04N 13/00* (2018.01)
*H04N 5/232* (2006.01)

(52) U.S. Cl.
CPC ................. *H04N 5/23232* (2013.01)

(58) Field of Classification Search
CPC ..... G06T 3/4053; G06T 7/0018; G06T 7/003; H04N 5/23232
See application file for complete search history.

(56) References Cited

U.S. PATENT DOCUMENTS

| 2010/0235129 A1 | 9/2010 | Sharma et al. |
| 2011/0285910 A1 | 11/2011 | Bamji et al. |
| 2012/0140061 A1* | 6/2012 | Zeng ............ G01S 13/726 348/135 |
| 2015/0317781 A1* | 11/2015 | Napier .......... G01S 17/023 348/46 |

OTHER PUBLICATIONS

G. Pandey, J.R McBride, S. Savarese, and R.M. Eustice, "Automatic extrinsic calibration of vision and lidar by maximizing mutal information" Journal of Field Robotics, vol. 32, No. 5; pp. 1-27, Aug. 2014. (Year: 2014).*

J. Park, H. Kim, Y.-W. Tai, M. S. Brown, and L Kweon, "High quality depth map upsampling for 3D-TOF cameras," in Proc. IEEE Int. Conf. Comp. Vis., Barcelona, Spain, Nov. 6-13, 2011, pp. 1623-1630.

Y. Li, T. Xue, L Sun, and J. Liu, "Joint example-based depth map super-resolution," in Proc. IEEE Int. Con. Multi., Melbourne, VIC, Australia, Jul. 9-13, 2012, pp. 152-157.

D. Ferstl, C. Reinbacher, R. Ranftl, M. Ruether, and H Bischof, "Image guided depth upsampling using anisotropic total generalized variation," in Proc. IEEE Int. Conf. Comp. Vis., Sydney, NSW, Australia, Dec. 1-8, 2013, pp. 993-1000.

(Continued)

*Primary Examiner* — Jessica M Prince
(74) *Attorney, Agent, or Firm* — Gennadiy Vinokur; James McAleenan; Hironori Tsukamoto

(57) ABSTRACT

A method for fusing measurements of sensors having different resolutions performs jointly a calibration of the sensors and a fusion of the their measurements to produce calibration parameters defining a geometrical mapping between coordinate systems of the sensors and a fused set of measurements that includes the modality of a sensor with resolution greater than its resolution. The calibration and the fusion are performed jointly to update the calibration parameters and the fused set of measurements in dependence on each other.

11 Claims, 6 Drawing Sheets

(56) References Cited

OTHER PUBLICATIONS

M.-Y. Liu, O. Tuzel, and Y. Taguchi, "Joint geodesic upsampling of depth images," in Proc. IEEE CVPR, Portland, OR, USA, Jun. 23-28, 2013, pp. 169-176.
N. Williams, K.-L. Low, C. Hantak, M. Pollefeys, and A. Lastra, "Automatic image alignment for 3D environment modeling," in Proc. IEEE SIBGRAPI, Curitiba, PR, Brazil, Oct. 17-20, 2004, pp. 388-395.
G. Pandey, J.R. McBride, S. Savarese, and R.M. Eustice, "Automatic extrinsic calibration of vision and lidar by maximizing mutual information," Journal of Field Robotics, vol. 32, No. 5, pp. 1-27, Aug. 2014.
J. Levinson and S. Thrun, "Automatic online calibration of cameras and lasers," in Robotics: Science and Systems, Berlin, Germany, Jun. 24-28, 2013, pp. 29-36.

* cited by examiner

SYSTEM AND METHOD FOR FUSING OUTPUTS OF SENSORS HAVING DIFFERENT RESOLUTIONS

FIELD OF THE INVENTION

This invention relates to sensing systems and methods, and more specifically to fusing outputs of sensors having different resolutions.

BACKGROUND OF THE INVENTION

Sensor fusion is a process of combining the sensory data derived from different sensors. As an increasing number of sensors and sensor modalities are used to acquire scenes, consolidation or fusion of the sensor data is becoming increasingly important. Sensor fusion exploits the distinct sensor modalities to provide complimentary information about the environment, overcome hardware limitations, or reduce data uncertainty due to each individual sensor. For example, the sensor fusion can increase, i.e., upsample, the resolution on data measured by one sensor using measurements of another sensor. Additionally or alternatively, the sensor fusion can annotate the data measured by one sensor with the measurements of another sensor.

For example, the depth sensing is a technology for measuring depths in a scene, i.e., the distances from a sensor to points in the scene. Types of depth sensing include measurements using structured light cameras, stereo cameras, and depth sensing cameras based on time-of-flight (TOF) measurements of the light reflected from the scene. Some depth sensors, such as LIDAR sensor, do not have sufficient resolution for practical applications. To that end, the fusion can be used for the depth superresolution, i.e., the low-resolution depth data from a LIDAR sensor can be fused with an image from an optical camera to produce a higher-resolution depth image.

The sensor fusion uses an extrinsic calibration that determines the calibration parameters of each sensor, such as position and orientation of each sensor with respect to each other. During the fusion, the calibration parameters are used to compute the geometric transformation that maps the output of each sensor to a common frame of reference.

For example, some methods perform offline calibration using known alignment targets. However, performing the offline calibration is not possible or practical for some applications. This problem is especially apparent when the sensors are installed at the moving vehicle. This is because such sensors are prone to lose the calibration due to potential roughness of the road conditions, and the calibrations needs to be performed online for constantly varying scenes.

Other methods perform calibration online using edges of the objects in the different images. However, in some applications, the calibration based on edge matching is inaccurate due to low resolution of the sensor measurements.

Accordingly, there is a need for a system and a method for fusing outputs of sensors having different resolution.

SUMMARY OF THE INVENTION

Some embodiments of the invention are based on a realization that fusion and calibration are complementary processes and improvements in one can be used to boost the performance of the other. Thus, a joint calibration and fusion method can improve the final output. In contrast to existing approaches, which typically address either calibration or fusion, but not both, the joint processing works towards a common objective: improving the final output of the sensor fusion as a function of calibration parameters.

Accordingly, some embodiments of the invention perform jointly the calibration of the sensors and the fusion of their outputs. For example, some embodiments of the invention jointly optimize the calibration parameters and the fusion output using the appropriate cost function in each case. For example, one embodiment updates the calibration parameters and the fused set of measurements in dependence on each other. For example, joint calibration and fusion can optimize a cost function of the fused set of measurements given the calibration parameters.

One embodiment of the invention discloses a method for fusing measurements of sensors having different resolutions. The method includes acquiring a first set of measurements of a scene measured by a first sensor; acquiring a second set measurements of the scene measured by a second sensor, wherein a modality of the first sensor differs from a modality of the second sensor, and wherein a resolution of the first sensor is less than a resolution of the second sensor; and performing jointly a calibration of the first and the second sensors and a fusion of the first and the second set of measurements to produce calibration parameters defining a geometrical mapping between coordinate systems of the first and the second sensors and a fused set of measurements that includes the modality of the first sensor with resolution greater than the resolution of the first sensor, wherein the calibration and the fusion are performed jointly to update the calibration parameters and the fused set of measurements in dependence on each other. The steps of the method are performed using a processor.

Another embodiment discloses a system including a first sensor to measure a scene to produce a first set of measurements of the scene; a second sensor to measure the scene to produce a second set measurements of the scene, wherein a resolution of the first sensor is less than a resolution of the second sensor; and a processor to perform jointly a calibration of the first and the second sensors and a fusion of the first and the second set of measurements to produce calibration parameters defining a geometrical mapping between coordinate systems of the first and the second sensors and a fused set of measurements that includes a modality of the first sensor with resolution greater than the resolution of the first sensor, wherein the calibration and the fusion are performed jointly to update the calibration parameters and the fused set of measurements in dependence on each other.

Yet another embodiment discloses a method for fusing outputs of uncalibrated sensors including acquiring a first set of measurements of a scene from a first sensor; acquiring a second set measurements of the scene from a second sensor, wherein a resolution of the first sensor is less than a resolution of the second sensor; fusing the first set of measurements using the second set of measurement to produce a fused set of measurements including a modality of the first sensor and a resolution greater than the resolution of the first sensor, wherein the fusing uses calibration parameters defining a geometrical mapping between a coordinate system of the first sensor and a coordinate system of the second sensor; comparing the fused set of measurements with the second set measurements to determine an error of the calibration parameters; updating the calibration parameters to reduce the error; and repeating the fusing, the comparing and the updating until a termination condition is met.

DETAILED DESCRIPTION OF THE PREFERRED EMBODIMENT

Figure 1A:
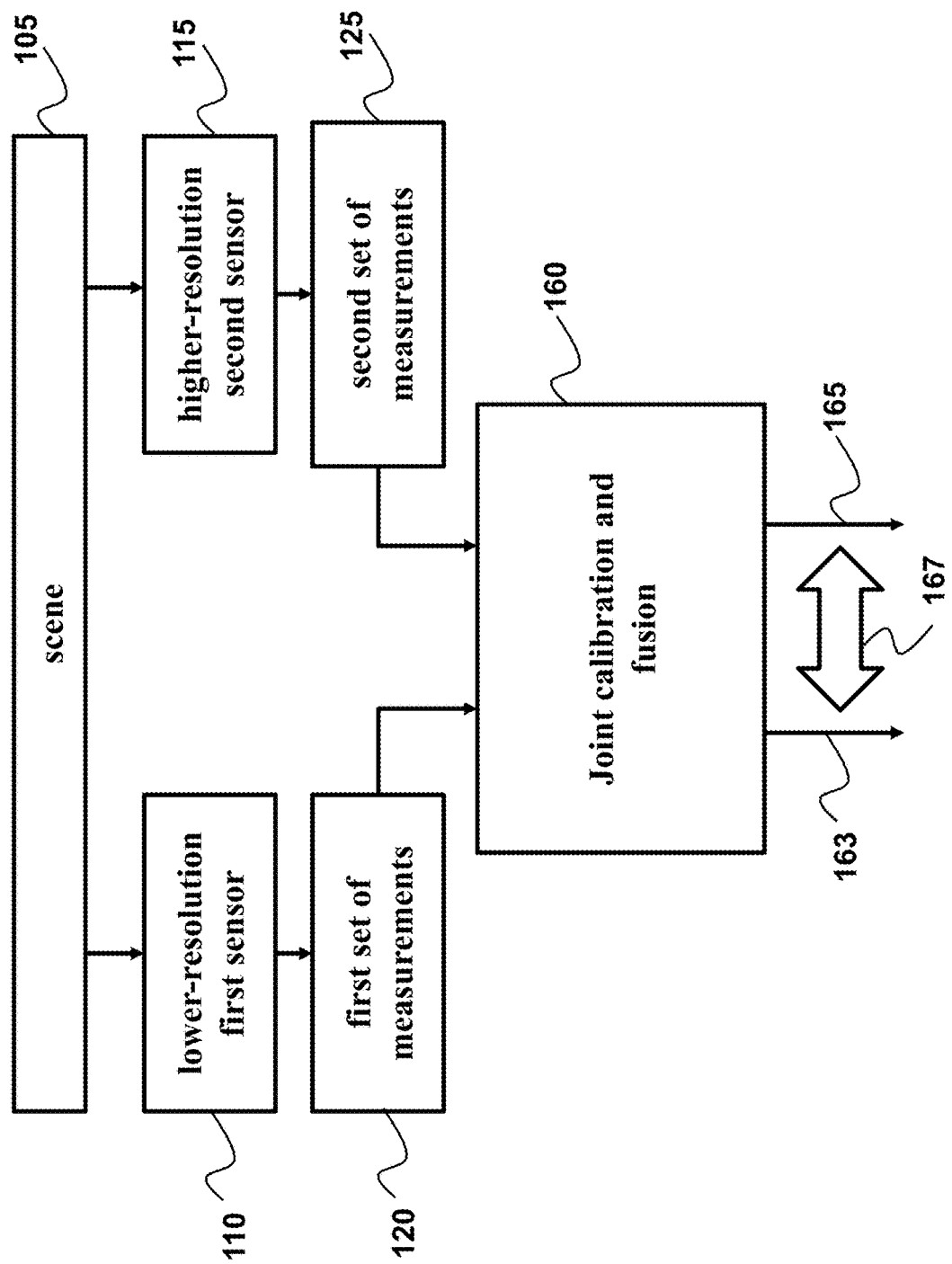
FIGS. 1A, 1B and 1C are block diagrams of methods for performing jointly the calibration of the sensors and the fusion of measurements of the sensors according to different embodiments of the invention.

FIG. 1A shows a block diagram of a method for performing jointly the calibration of the sensors and the fusion of measurements of the sensors according to some embodiments of the invention. The method acquires 120 a first set of measurements of a scene 105 from a first sensor 110 and also acquires 125 a second set measurements of the scene 105 from a second sensor 115.

Steps of the method are performed using a processor, such as a processor internal or external to one of the sensors. The measurements can be acquired directly from the sensors or indirectly, e.g., from a memory storage and/or over a wired or wireless channel of communication. In some embodiments, a resolution of the first sensor is less than a resolution of the second sensor. Additionally, in some embodiments, the modality of the first sensor differs from a modality of the second sensor.

Some embodiments identify information about a scene using different types and/or modality of sensor data. A scene can be any physical area for which sensor measurements can be generated. For example, without limitation, a scene may be an area in a city, a neighborhood, an area in a forest, an underwater region, a region of airspace, an area in a manufacturing facility, a room, a surface of a structure, or some other suitable type of the scene.

The different modalities of the first and the second sensors include, but are not limited to, acoustic data, biometric data, imaging data, voltage readings, vibration data, and other suitable types of sensor data. These different modalities of sensor data can be used in performing operations, such as detecting the presence of objects in the scene, identifying the objects in the scene, tracking the movement of objects in the scene, detecting changes in an environment of the scene, measuring distances between objects in the scene, and other suitable operations.

As one example, different types of imaging data may be used for detecting, identifying, and/or tracking objects in a scene. The different types of imaging data can include, for example, electro-optical (EO) images, infrared (IR) images, thermal images, radar images, ultraviolet images, and other suitable types of imaging data.

For example, in one embodiment, the first sensor is a depth sensor, such as is a LIDAR sensor that measures distance by illuminating a target with a laser and analyzing the reflected light. An example of a second sensor is an optical camera for recording intensities of the images of the scene.

Some embodiments of the invention are based on recognition that sensor fusion requires calibration that determines the geometric parameters of each sensor, such as position and orientation, with respect to the other ones. For example, the calibration of two sensors attempts to determine a perspective projection of the frame of reference of one system to the frame of reference of the other. This projection can be described by a number of parameters, also known as degrees of freedom. As an example, one embodiment of the invention determines a transformation with six degrees of freedom: three angle rotations (roll, pitch, and yaw) and three translations (along the x, y, and z axes). In this embodiment, the calibration parameters are $\theta=(\theta_{roll}, \theta_{pitch}, \theta_{yaw}, \theta_x, \theta_y, \theta_z)$. However, other embodiments can consider fewer or more degrees of freedom. For example, one embodiment does not consider rotations. Additionally or alternatively, another embodiment determines relative magnification and distortion factors of the sensors. Those parameters are referred herein as calibration parameters that define a geometrical mapping between a coordinate system of the first sensor and a coordinate system of the second sensor. The coordinate system of the sensor can be used as a frame of reference for performing the fusion of the sensor measurements.

For convenience, the global frame of reference typically coincides with the frame of reference of one of the sensors. In the example embodiment, the higher resolution sensor 115 provides the global frame of reference. After the calibration parameters are known, the geometry can be trivially mapped to any frame of reference, including that of the lower resolution sensor 110.

The first set of measurements 120 in its frame of reference is denoted $\psi \in \mathbb{R}^M$, where M is the number of measurements in the first set. For example, when the lower resolution sensor corresponds to a LIDAR system $\psi$ represents a point cloud, i.e., a set of (x, y, z) Cartesian coordinates from which a LIDAR reflection has been recorded.

The second set of measurements 125 in its frame of reference is denoted $u \in \mathbb{R}^N$, where N is the total number of measurements in the second set. For example, when the higher resolution sensor corresponds to an optical camera, the second set of measurements include a total of $N=N_x*N_y$ measurements, where $N_x$ and $N_y$ is the number of horizontal and vertical pixels, respectively. This disclosure uses $n \in \{1, \ldots, N\}$ to index the elements of u and other similarly sized data, essentially vectorizing them.

Given calibration parameters $\theta$, the first set of measurements can be mapped onto the frame of the higher resolution sensor using a linear 3D rigid body transformation $$\mathcal{P}_\theta\{\psi\}=P\psi,$$

where P is the projection matrix characterized by the calibration parameters $\theta$.

Some embodiments are based on realization that that the calibration and the fusion are complementary processes and improvements in one can be used to boost the performance of the other. To that end, the embodiments perform 160 jointly a calibration of the first and the second sensors and a fusion of the first and the second set of measurements to produce calibration parameters 163 defining a geometrical mapping between a coordinate system of the first sensor and a coordinate system of the second sensor, and a fused set of measurements 165 that includes the modality of the first sensor and has a resolution greater than the resolution of the first sensor. As used herein, the joint calibration and fusion update both the calibration parameters 163 and the fused set of measurements 165 in dependence 167 on each other.

For example, in one embodiment, the joint calibration and fusion 160 updates the calibration parameters and the fused set of measurements recursively until a termination criterion is met, such that the calibration parameters are updated in response to a change of the fused set of measurements and the fused set of measurements is updated in response to a change of the calibration parameters.

For example, the calibration estimates the calibration parameters θ directly from the first and the second set of measurements $$\hat{\theta} = f_{calibration}(u, \psi).$$

The first set of measurements, in contrast to the second set of measurements, has significantly lower resolution. Given calibration parameters, fusion 130 integrates the data from both sensors to produce data that combine information from both. For example, in some embodiment, a goal of fusion is to estimate a high-resolution data $\phi_\theta \in \mathbb{R}^N$, where each element of $\phi$ has the modality of the first sensor in the frame of reference of the second sensor $$\hat{\phi} = f_{fusion}(u, \psi, \theta)$$

The quality of the output of the fusion process can typically be estimated from the fused data using a cost function that takes lower or higher values when the fusion quality improves.

Figure 1B:
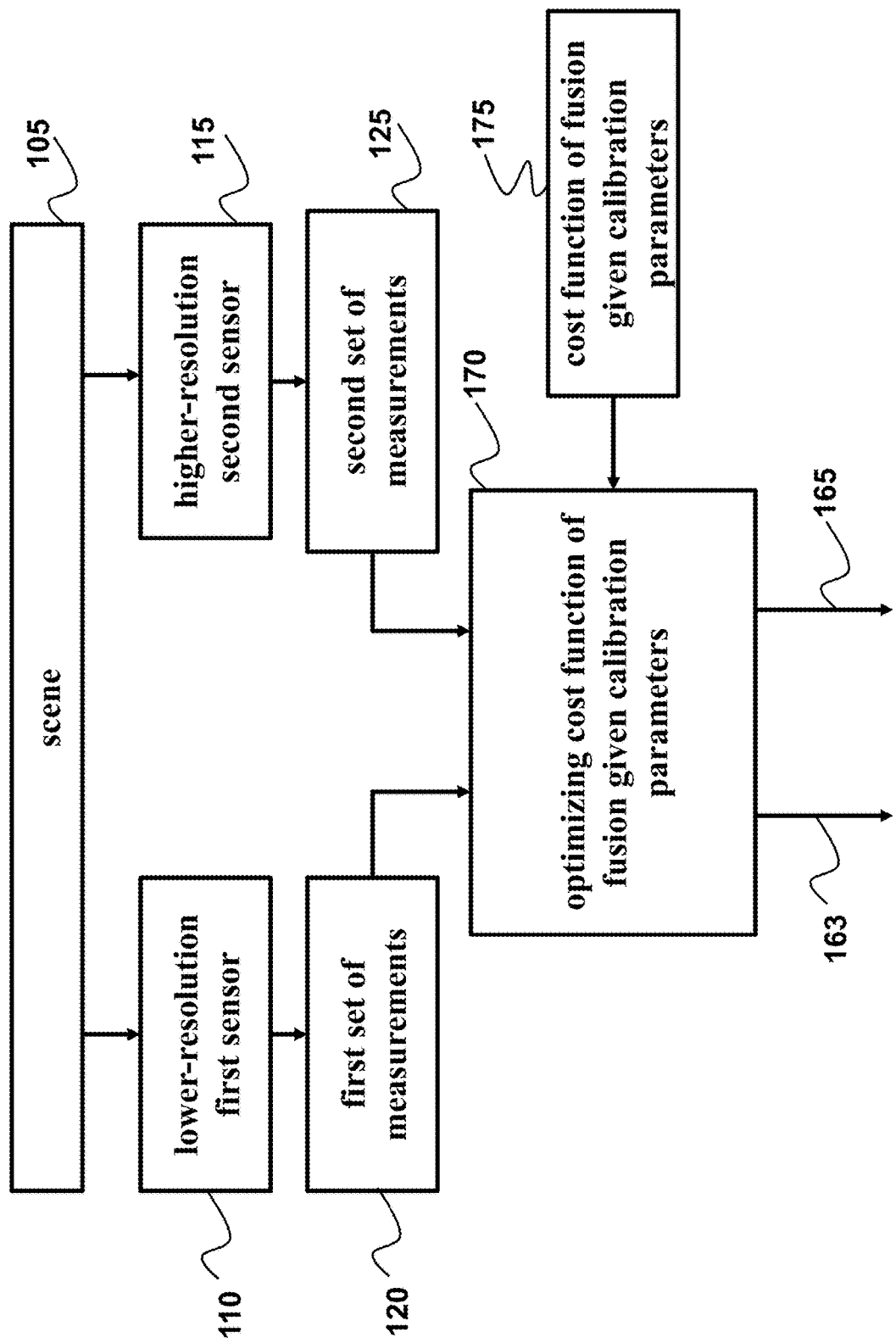

FIG. 1B shows a block diagram of a method for performing jointly the calibration of the sensors and the fusion of their outputs according to one embodiment of the invention. In this embodiment, the calibration and the fusion is jointly performed by optimizing 170 a cost function 175 of the fused set of measurements given the calibration parameters.

For example, to estimate the calibration parameters, some embodiments of the invention exploit the output of the fusion process, as well as the cost, which represents the fusion quality and is estimated from the fused data. Specifically, one embodiment uses $\phi_\theta = f_{fusion}(u, \psi, \theta)$ to compactly denote the fused set of measurements given the calibration parameters θ. The calibration parameters are estimated by optimizing a cost function on $\phi_\theta$, which corresponds to the cost function used to evaluate the quality of the fusion process. In some embodiment, the optimizing includes increasing or decreasing the cost function until a termination condition is met.

In the embodiments wherein the optimizing include the decreasing the cost function, the optimizing method penalizes miss-alignments between edges of the fused set of measurements and the second set of measurements $$\hat{\theta} = \mathrm{argmin}_\theta \{F(\theta)\},$$

where $$F(\theta) = \sum_k \frac{A_k(\phi_\theta)}{N_k(\phi_\theta)}.$$

For example, the numerator $A_k(\phi_\theta)$, measures the weighted $l_1$ total variation (TV) of the fused set of measurements that can be defined as follows $$A_k(\phi_\theta) = \sum_{n \in \Omega_\theta} w_{k,n} |[\nabla_k \phi_\theta]_n|$$

where k is denotes the direction and $\nabla_k$ denotes the gradient operating on $\phi_\theta$ along the direction k. For example, when $\phi_\theta$ corresponds to low-resolution LIDAR data fused with high-resolution camera data, k is either the horizontal x or vertical y direction. The weights $w_{k,n}$ are specified using the second set of measurements $$w_{k,n} = e^{-\gamma |[\nabla_k u]_n|},$$

thus promoting the alignment of edges between the second set of measurements and the fused set of measurements, as controlled by the running parameter γ≥0. In some embodiments, data corresponds to LIDAR and camera measurements and the edges correspond to the boundaries of objects in the corresponding images.

In one embodiment, the set $\Omega_\theta \neq \emptyset$ denotes the subset of positions corresponding to the measurements from the low-resolution sensor. Restricting the cost to those points ensures consideration of only the regions where the fused set of measurements is reliable. Note that, even though the function is only computed in those points, performing fusion is required in order to be able to calculate the gradients in those positions.

Additionally or alternatively, given an edge in the second set of measurements, a large γ does not penalize a corresponding edge in the fused set of measurements. Thus, only edges in the fused set of measurements that do not have corresponding edges in the second measurement set, i.e., not properly aligned, are penalized. A small γ, on the other hand, reduces the effect of the second measurement set, thus penalizing edges in the fused set of measurements similarly; irrespective on whether the second set of measurements has a corresponding edge.

The denominator is a necessary normalization factor that takes into account the difference in number of points in $\Omega_\theta$ that are included in the evaluation given different parameter sets θ

$$N_k(\phi_\theta) = (\Sigma_{n \in \Omega_\theta} w_{k,n})(\Sigma_{n \in \Omega_\theta} |[\nabla_k \phi_\theta]_n|).$$

Figure 1C:
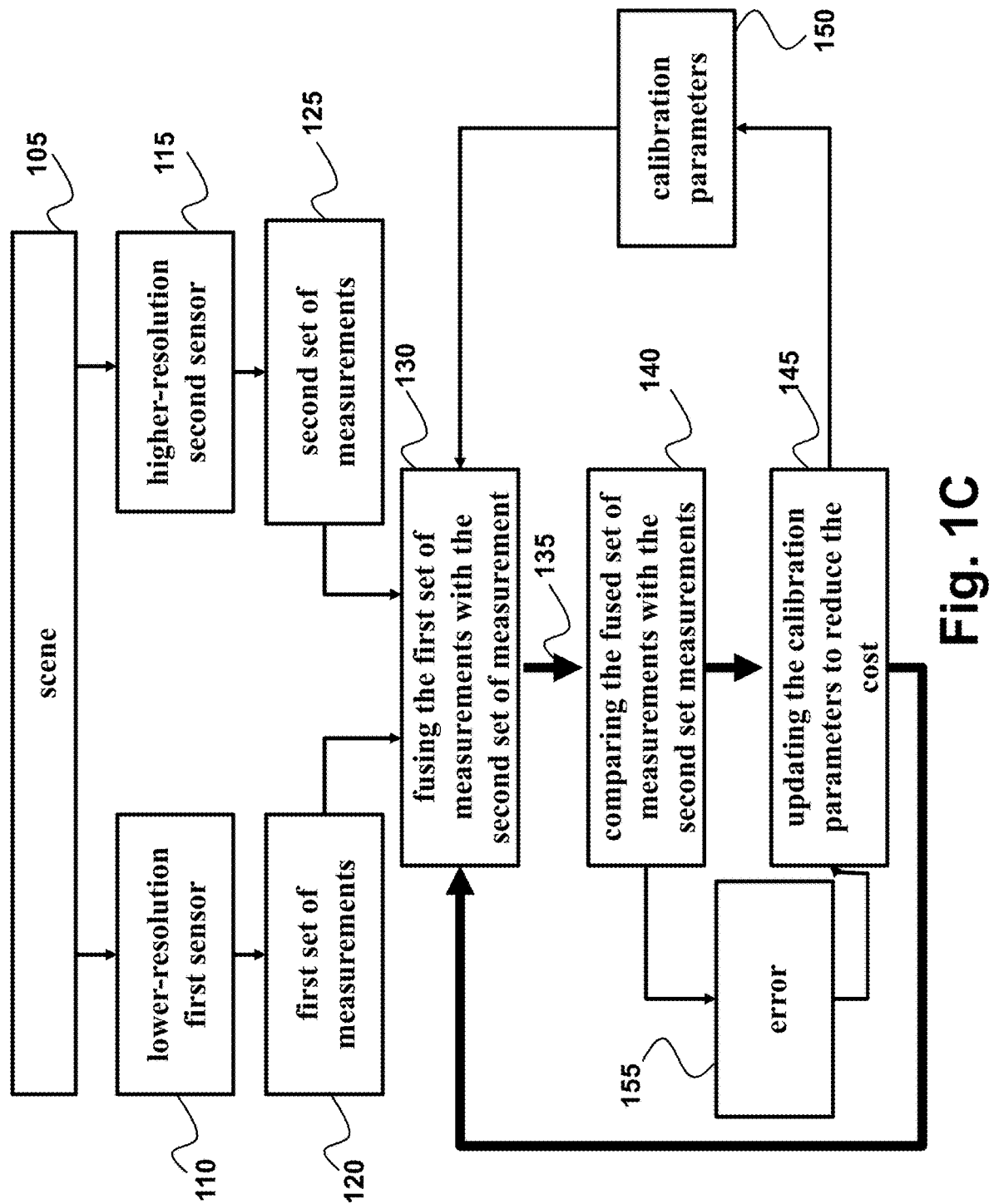

FIG. 1C shows a block diagram of a method for performing jointly the calibration of the sensors and the fusion of their outputs according to another embodiment of the invention. In this embodiment, the data from the two sensors is fused using current value of the calibration parameters and the output of the fusion is compared with the second set of measurements to determine the error in the fusion that is used to update the calibration parameters.

For example, the embodiment fuses 130 the first set of measurements 120 using the second set of measurement 125 to produce a fused set of measurements 135 with the modality of the first sensor and a resolution greater than the resolution of the first sensor. The embodiment compares 140 the fused set of measurements 135 with the second set measurements 125 to determine an error 155 of the calibration parameters. The embodiment updates 145 the calibration parameters 150 to reduce the error 155. In some implementations, the error 155 is designed as the cost function 175, such that the error measures the quality of the fusion process and the calibration.

The process is iterated using the updated calibration parameters 150, until a termination criterion is satisfied. The method outputs the estimated calibration parameters, or the fused data, or both, as required by the subsequent processing. A final fusion step can optionally be performed using the estimated calibration parameters.

Sensor Fusion

Given a fixed parameter vector θ, the fusion estimates $\hat{\phi}_\theta$ using the second set of measurements u and the projection of the first set of measurements to the global frame of reference $\mathcal{P}_\theta\{\psi\}$.

In one embodiment, the fusion determines higher resolution data corresponding to the modality of the lower resolution sensor. The quality of the high resolution data can be estimated in a variety of ways. One embodiment uses an $l_2$ penalty to promote consistency of the resulting fused set of measurements with the projected data. In other words, the embodiment measures the data fidelity D(Φ), or the error, using $$\mathcal{D}(\phi) = \frac{1}{2}\|\mathcal{P}_\theta\{\psi\} - H\phi\|_{l_2}^2,$$

where H: $\mathbb{R}^N \rightarrow \mathbb{R}^M$ is a masking operator which selects only the indices where we have data in the projection $\mathcal{P}_\theta\{\psi\}$.

One embodiment, because the first set of measurements has a lower-resolution, regularizes the fusion using the weighted isotropic total-variation (TV) of the first set of measurements $$\mathcal{R}(\phi) = \sum_{n=1}^{N} w_n \|[\nabla \phi]_n\|_{l_2}$$

which promotes sharper edges according to weights $w_n$.

The fusion combines the data fidelity and the regularization terms into a single cost function that estimates the fusion quality. The fusion outputs fused data that minimize this cost, as follows $$\hat{\phi}_\theta = \underset{\tilde{\theta} \in \Phi}{\operatorname{argmin}}\{\mathcal{D}(\phi) + \lambda \mathcal{R}(\phi)\}$$

where $\Phi \subseteq \mathbb{R}^N$ is used to enforce certain physical constraints on the fused set of measurements and $\lambda > 0$ controls the amount of regularization. For example, when first set of measurements corresponds to depth, Φ enforces non-negativity of the fused depth data.

Figure 2:
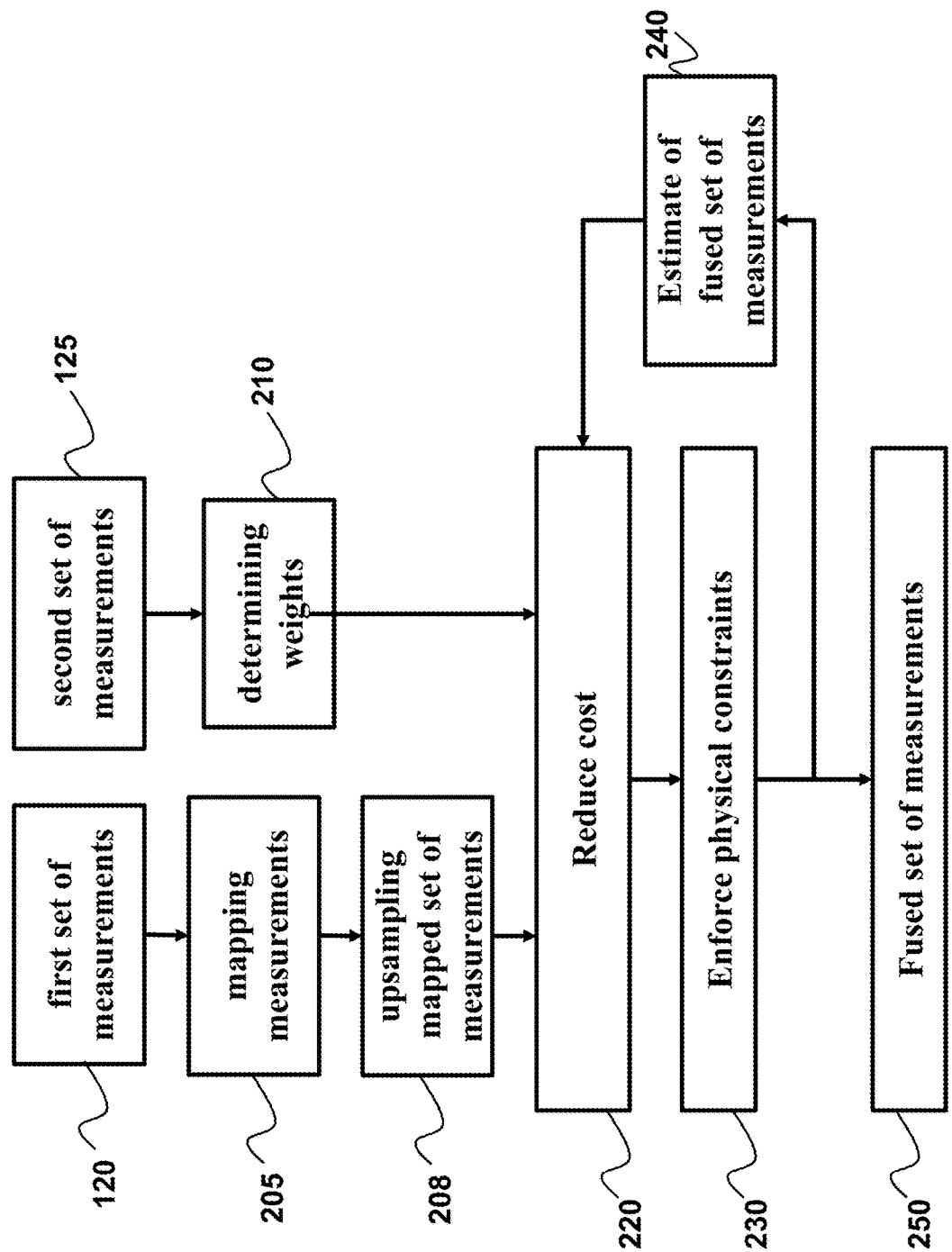
FIG. 2 is a block diagram of a fusion method for determining the fused set of measurements according to some embodiments of the invention.

FIG. 2 shows a fusion method for determining the fused set of measurements according to some embodiments of the invention. The first set of measurements 120 is mapped to the frame of reference of the second set of measurements 205 and the mapped first set of measurements is upsampled 208 to a target resolution. For example, the target resolution can be the resolution of the second set of measurements.

In some embodiments, the fusion exploits the second set of measurements to improve the fusion output through weights $w_n$. To that end, one embodiment determines 210 the weights $w_n$ 210 using the second set of measurements u 125. For example, some embodiments select the weights as a function of the gradient of the second set of measurements at each location, such that corresponding edges in the depth image are not penalized.

Some embodiments are based on understanding that when the calibration parameters are incorrect, this weighting can introduce spurious edges that confuse the subsequent calibration. Thus, in some embodiments, while calibration is performed, the weights as selected as $w_n = 1$. After the calibration parameters are estimated, a final fusion step can be performed using different weights, such as $w_n = \exp(-\tau \|[\nabla u]_n\|_{l_2})$ for a constant τ>0. Alternative embodiments use weights that take small values if $[\nabla u]_n$ is large and large values if $[\nabla u]_n$ is small.

The embodiment determines 220 the fused set of measurements by computing a direction that reduces the cost function $\mathcal{D}(\phi) + \lambda \mathcal{R}(\phi)$ and update 240 the fused set of measurements according the direction. For example, one implementation uses a steepest descend method to perform the update 240 according to $$\phi^t \leftarrow \phi^{t-1} - \nu H^T (H\phi^{t-1} - P\psi) - \nu \tilde{\nabla} \mathcal{R}(\phi^{t-1})$$

where ν>0 is the step-size, $\tilde{\nabla}\mathcal{R}$ is a subgradient of $\mathcal{R}$, $\phi^{t-1}$ and $\phi^t$ are old and new fused set of measurements, respectively.

To enforce 230 physical constraints, one embodiment sets the violating values to the closest constraint. For example, to enforce non-negativity of the fused depth data, the embodiment sets the negative depth values to 0. The resulting estimate of the fused set of measurements is used to iterate the steps 220, 230 and 240 until a stopping criterion is reached and to output a final fused set of measurements 250.

EXAMPLE EMBODIMENTS

Figure 3:
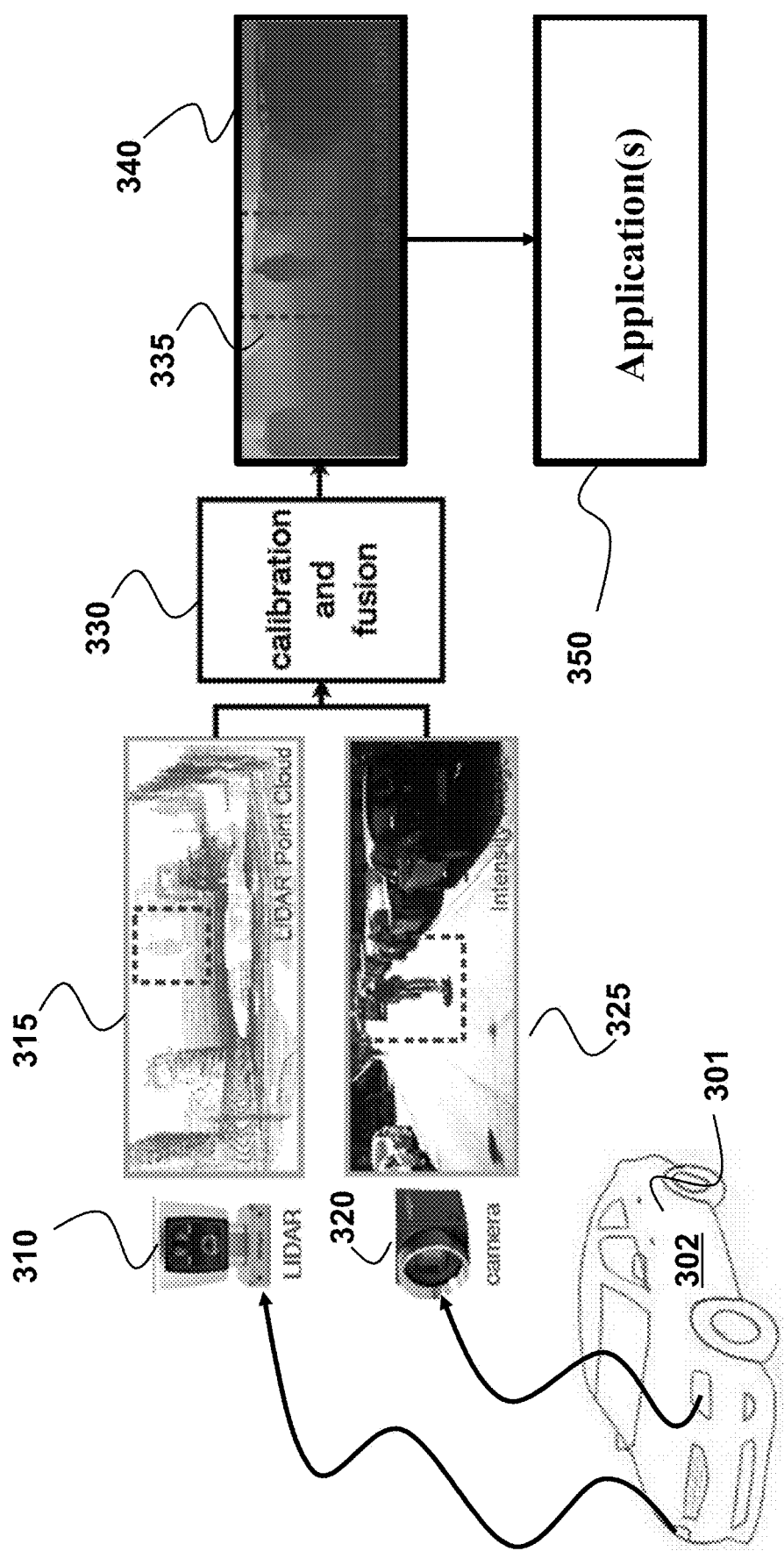
FIG. 3 is a schematic of a system according to one embodiment of the invention.

FIG. 3 shows a schematic of a system according to one embodiment of the invention. The system include a first sensor 310 to measure a scene to produce a first set of measurements of the scene and a second sensor 320 to measure the scene to produce a second set measurements of the scene. For example, the first sensor 310 is a LIDAR and the second sensor 320 is a camera. The LIDAR sensor 310 is the low-resolution first sensor and the camera 320 is the high-resolution second sensor.

The system also includes a processor 302 to perform jointly a calibration of the first and the second sensors and a fusion of the first and the second set of measurements according to principles employed by various embodiments of the invention. For example, in one embodiment, the first and the second sensors are installed at a vehicle 301 and the processor 302 forms a part of a computational system of the vehicle. Additionally or alternatively, the processor 302 can be the processor of the sensors 310 and/or 320.

The LIDAR records the distance of objects according to its frame of reference and provides the data in the form of a point cloud 315. In some embodiments, the LIDAR also records the reflectivity of objects. Typical LIDAR sensors scan horizontally, with few vertical directions, ranging between 1 and 64, although more directions are possible. Thus, while LIDAR can provide precise depth information, this information has low spatial resolution.

The camera records the reflectivity of objects according to its frame of reference and provides the measurements in the form of an image 325. In contrast to the LIDAR, high-resolution cameras are inexpensive. Thus, cameras can provide high spatial resolution information on the reflectivity of objects. However, cameras provide no depth information.

The difference of resolution and type of information recorded by the two sensors make fusion very appealing. When fusing the data from the two sensors, one embodiment outputs a depth map with high spatial resolution and precise depth information for all the objects in the scene. The depth map is aligned and corresponds to the intensity map recorded by the high-resolution camera, thus providing depth information to the intensity information recorded by the camera. In other words, one embodiment uses joint calibration and fusion 330 to augment both sensors, i.e., to increase resolution of the LIDAR output 335 and to incorporate high-resolution depth information into the camera output. The result of the fusion can be rendered on a display 340 or submitted to different applications 350, e.g., an object tracking application.

When the camera and LIDAR are mounted to observe the same scene, their frames of reference are different. If after the sensors are mounted their frame of the reference remains constant, the extrinsic calibration before the fusion can be practical. If, for example, the camera moves even slightly, the off-line calibration procedure with known targets should be repeated at significant cost and downtime.

In practice, the calibration of the sensors is not fixed. In general sensors can drift over time as mounting components deform or loosen. Accidental contact can also change the orientation of the sensors significantly. Thus, the example embodiment automatically calibrates the two sensors continuously as they operate, without a need for off-line manual calibration. In particular, the joint fusion and calibration process operates continuously, estimating both the calibration parameters and the fused data.

In different embodiments, in order to reduce computation, the joint calibration and fusion process is performed intermittently, e.g., once per second, minute, or hour (or less frequently), to update the calibration parameters. In-between only fusion is performed using the last computed calibration parameters. This approach assumes that the sensor orientation, and therefore the calibration parameters, remain approximately unchanged during the time period in which only fusion is performed, e.g., over a second, minute, or hour, respectively. If the sensor orientation changes during that time, then fusion is performed with incorrect parameters and might produce incorrect results.

Such embodiments are particularly useful in automotive applications and autonomous navigation systems. Such systems rely on LIDAR and camera installed on a vehicle 301 to understand the environment and compute their actions. For example, a driver-assistance safety system can use the fusion output of the embodiment to decelerate or change lanes in a vehicle if traffic ahead stops suddenly. Similarly, an autonomous vehicle or a robot can exploit such fused information to determine its position and the obstacles on its path, and determine the appropriate navigation route. However, for such systems to operate properly the sensors needs to be calibrated. Different embodiments of the invention ensure the accuracy of the without requiring frequent downtime for off-line recalibration.

Figure 4:
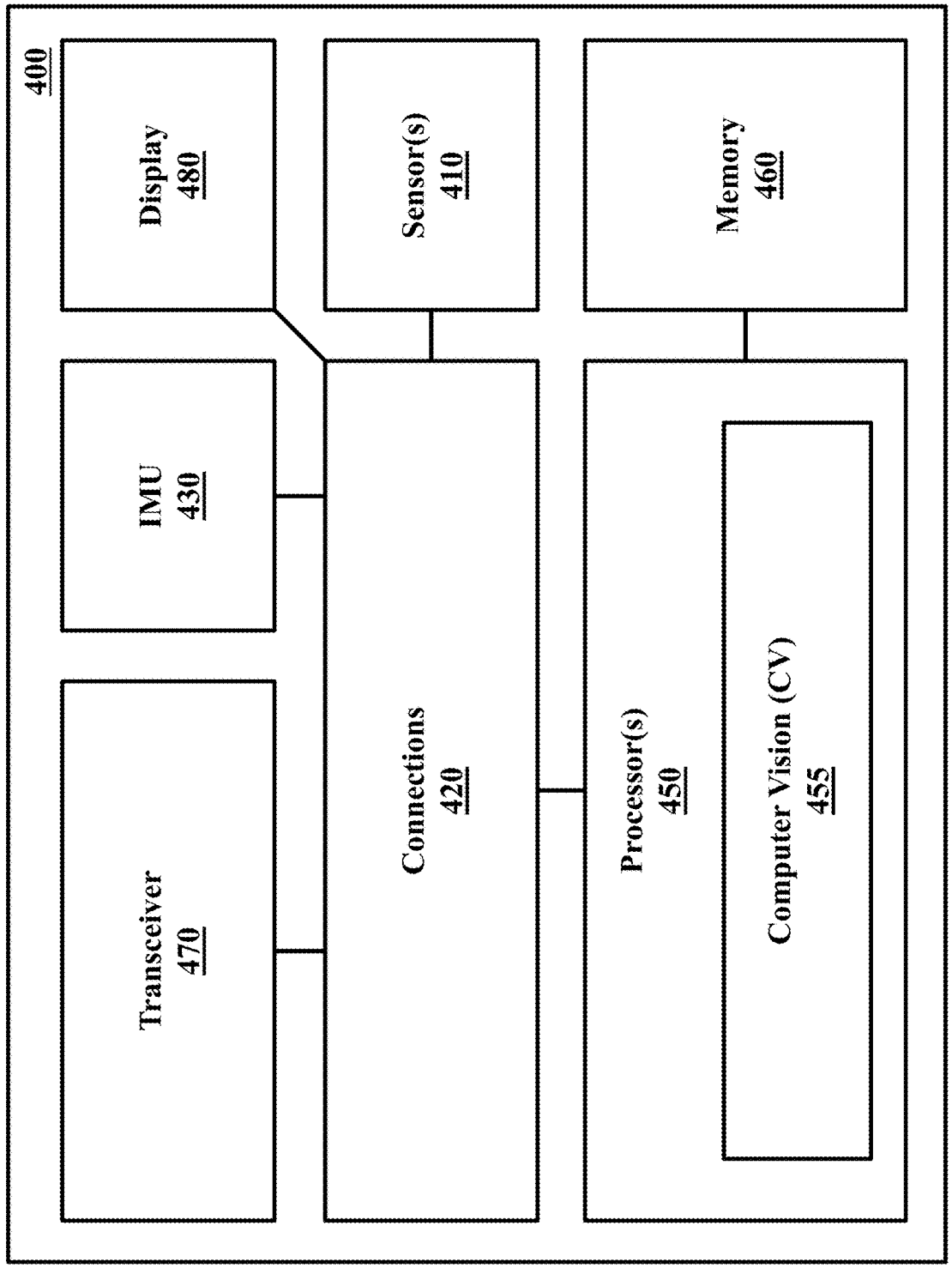
FIG. 4 is a block diagram of an exemplary system for fusing outputs of the sensors according to some embodiments of the invention.

FIG. 4 shows a block diagram of an exemplary system 400 configured for fusing outputs of the sensors according to some embodiments of the invention. The system 400 can be implemented internal to the first and/or the second sensor. Additionally or alternatively, the system 400 can be communicatively connected to the sensors for performing the fusion.

The system 400 can include one or combination of a camera 410, an inertial measurement unit (IMU) 430, a processor 450, a memory 460, a transceiver 470, and a display/screen 480, which can be operatively coupled to other components through connections 420. The connections 420 can comprise buses, lines, fibers, links or combination thereof.

The transceiver 470 can, for example, include a transmitter enabled to transmit one or more signals over one or more types of wireless communication networks and a receiver to receive one or more signals transmitted over the one or more types of wireless communication networks. The transceiver 470 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 400 can comprise image sensors such as CCD or CMOS sensors, lasers and/or camera 410, which are hereinafter referred to as "sensor 410". For example, the sensor 410 can convert an optical image into an electronic or digital image and can send acquired images to processor 450. Additionally or alternatively, the sensor 410 can sense the light reflected from a target object in a scene and submit the intensities of the captured light to the processor 450.

For example, the sensor 410 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 410 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 410. For example, in some embodiments, the sensor 410 includes RGBD cameras, which may capture per-pixel depth (D) information when the depth sensor is enabled, in addition to color (RGB) images.

As another example, in some embodiments, the sensor 410 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 410. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 410 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 400 can be operatively connected to multiple sensors 410, such as dual front cameras and/or a front and rear-facing cameras, which may also incorporate various sensors. In some embodiments, the sensors 410 can capture both still and video images. In some embodiments, the sensor 410 can include RGBD or stereoscopic video cameras capable of capturing images at, e.g., 30 frames per second (fps). In one embodiment, images captured by the sensor 410 can be in a raw uncompressed format and can be compressed prior to being processed and/or stored in memory 460. In some embodiments, image compression can be performed by the processor 450 using lossless or lossy compression techniques.

In some embodiments, the processor 450 can also receive input from IMU 430. In other embodiments, the IMU 430 can comprise 3-axis accelerometer(s), 3-axis gyroscope(s), and/or magnetometer(s). The IMU 430 can provide velocity, orientation, and/or other position related information to the processor 450. In some embodiments, the IMU 430 can output measured information in synchronization with the capture of each image frame by the sensor 410. In some embodiments, the output of the IMU 430 is used in part by the processor 450 to fuse the sensor measurements and/or to further process the fused measurements.

The system 400 can also include a screen or display 480 rendering images, such as color and/or depth images. In some embodiments, the display 480 can be used to display live images captured by the sensor 410, fused images, such as the image 335, augmented reality (AR) images, graphical user interfaces (GUIs), and other program outputs. In some embodiments, the display 480 can include and/or be housed with a touchscreen to permit users to input data via some combination of virtual keyboards, icons, menus, or other GUIs, user gestures and/or input devices such as styli and other writing implements. In some embodiments, the display 480 can be implemented using a liquid crystal display (LCD) display or a light emitting diode (LED) display, such as an organic LED (OLED) display. In other embodiments, the display 480 can be a wearable display.

In some embodiments, the result of the fusion can be rendered on the display 480 or submitted to different applications that can be internal or external to the system 400. For example, a computer vision (CV) application 455 running on the processor 450 can implement and execute computer vision based tracking, model-based tracking, and/or simultaneous localization and mapping (SLAM) methods.

Exemplary system 400 can also be modified in various ways in a manner consistent with the disclosure, such as, by adding, combining, or omitting one or more of the functional blocks shown. For example, in some configurations, the system 400 does not include the IMU 430 or the transceiver 470. Further, in certain example implementations, the system 400 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 450 can be implemented using a combination of hardware, firmware, and software. The processor 450 can represent one or more circuits configurable to perform at least a portion of a computing procedure or process related to sensor fusion and/or methods for further processing the fused measurements. The processor 450 retrieves instructions and/or data from memory 460. The processor 450 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 460 can be implemented within the processor 450 and/or external to the processor 450. As used herein the term "memory" refers to any type of long term, short term, volatile, nonvolatile, or other memory and is not to be limited to any particular type of memory or number of memories, or type of physical media upon which memory is stored. In some embodiments, the memory 460 holds program codes that facilitate sensor fusion and/or one or more image processing, perform SLAM, tracking, 3D reconstruction, and other tasks performed by CV 455 on processor 450.

For example, the memory 460 can store the measurements of the sensors, such as still images, depth information, video frames, program results, as well as data provided by the IMU 430 and other sensors. In general, the memory 460 can represent any data storage mechanism. The memory 460 can include, for example, a primary memory and/or a secondary memory. The primary memory can include, for example, a random access memory, read only memory, etc. While illustrated in FIG. 4 as being separate from the processors 450, it should be understood that all or part of a primary memory can be provided within or otherwise co-located and/or coupled to the processors 450.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 460 and/or the processor 450.

In some embodiments, the CV 455 can implement various computer vision methods and/or process images captured by the sensor 410. For example, the CV 455 can be configured for processing one or more images captured by the sensor 410 to perform reconstruction of an environment being modeled using the depth information associated with the captured images.

Based on the depth data, during reconstruction each pixel can be assigned a 3D coordinate. In one embodiment, the CV 455 on the processor 450 tracks the position of the camera 410 by using a monocular (single camera) visual SLAM system to build a coarse map of the environment around the MS for accurate and robust 6DOF tracking of camera 410. The term monocular refers to the use of a single non-stereoscopic camera to capture images or to images captured without depth information. Other reconstruction method can then use the camera pose and per-pixel depth information to extrude the captured image(s) along a viewing direction. For example, in one embodiment the processor 450 is configured to track an object in the scene using the fused set of measurements.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for fusing measurements of sensors having different resolutions, comprising:
    acquiring a first set of measurements of a scene measured by a first sensor;
    acquiring a second set measurements of the scene measured by a second sensor, wherein a modality of the first sensor differs from a modality of the second sensor, and wherein a resolution of the first sensor is less than a resolution of the second sensor; and
    performing jointly a calibration of the first and the second sensors, and a fusion of the first and the second set of measurements to produce calibration parameters defining a geometrical mapping between coordinate systems of the first and the second sensors, and a fused set of measurements that includes an upsampled first set of measurement of the modality of the first sensor with resolution greater than the resolution of the first sensor, wherein the calibration and the fusion are performed jointly and iteratively to update the calibration parameters and the upsampled first set of measurements in dependence on each other until a termination condition is met, wherein, during an iteration, the fusion upsamples the first set of measurements guided by values of the second set of measurements related to the first set of measurements according to the calibration parameters to produce the upsampled first set of measurements that minimizes a cost function that determines an alignment error between the upsampled first set of measurements and the second set of measurements, and the calibration updates the calibration parameters based on the cost function, such that, for the next iteration, the upsampled first set of measurements determined using the updated calibration parameters reduces the alignment error according to the cost function, wherein steps of the method are performed using a processor.

2. The method of claim 1, wherein the joint calibration and fusion minimizes the cost function given the calibration parameters.

3. The method of claim 1, wherein the first and the second sensors are installed at a vehicle for acquiring the first and the second sets of measurements.

4. The method of claim 1, wherein the first sensor is a depth sensor and the second sensor is a camera, wherein the first set of measurements is a depth image with the resolution of the depth sensor, wherein the second set of measurements is an intensity image with the resolution of the camera, and wherein the fused set of measurements is a depth image with the resolution of the camera.

5. A system, comprising:
    a first sensor to measure a scene to produce a first set of measurements of the scene;
    a second sensor to measure the scene to produce a second set measurements of the scene, wherein a resolution of the first sensor is less than a resolution of the second sensor; and
    a processor to perform jointly, (1) a calibration of the first and the second sensors, and (2) a fusion of the first and the second set of measurements to produce calibration parameters defining a geometrical mapping between coordinate systems of the first and the second sensors and a fused set of measurements that includes an upsampled first set of measurement of a modality of the first sensor with resolution greater than the resolution of the first sensor, wherein the calibration and the fusion are performed jointly to update the calibration parameters and the fused set of measurements in dependence on each other, wherein the fusion upsamples the first set of measurements to produce the upsampled first set of measurements using values of the second set measurements, such that the joint calibration and fusion optimizes a cost function given the calibration parameters, wherein the calibration and the fusion are performed jointly and iteratively to update the calibration parameters and the upsampled first set of measurements in dependence on each other until a termination condition is met, wherein during a current iteration the fusion upsamples the first set of measurements guided by values of the second set of measurements, related to the first set of measurements according to the calibration parameters, to produce the upsampled first set of measurements that minimizes a cost function that determines an alignment error between the upsampled first set of measurements and the second set of measurements, and the calibration updates the calibration parameters based on the cost function, such that, for the next iteration, the upsampled first set of measurements determined using the updated calibration parameters reduces the alignment error according to the cost function.

6. The system of claim 5, wherein the processor is configured to track an object in the scene using the fused set of measurements.

7. The system of claim 5, wherein the first and the second sensors are installed at a vehicle for acquiring the first and the second sets of measurements, and wherein the processor forms a part of a computational system of the vehicle.

8. The system of claim 5, wherein the first sensor is a depth sensor and the second sensor is a camera, wherein the first set of measurements is a depth image with the resolution of the depth sensor, wherein the second set of measurements is an intensity image with the resolution of the camera, and wherein the fused set of measurements is a depth image with the resolution of the camera.

9. A method for fusing outputs of uncalibrated sensors, comprising:
    acquiring a first set of measurements of a scene from a first sensor;
    acquiring a second set measurements of the scene from a second sensor, wherein a resolution of the first sensor is less than a resolution of the second sensor;
    performing jointly, (1) a calibration of the first and the second sensors, and (2) a fusion of the first and the second set of measurements, wherein the calibration and the fusion are performed jointly and iteratively to update the calibration parameters and the fused set of measurements in dependence on each other until a termination condition is met, wherein during a current iteration the fusion upsamples the first set of measurements guided by values of the second set of measurements, related to the first set of measurements according to the calibration parameters, to produce an upsampled first set of measurements that minimizes a cost function that determines an alignment error between the upsampled first set of measurements and the second set of measurements, and the calibration updates the calibration parameters based on the cost function, such that, for the next iteration, the upsampled first set of measurements determined using the updated calibration parameters reduces the alignment error according to the cost function.

10. The method of claim 9, wherein the modality of the first sensor differs from a modality of the second sensor, wherein the fused set of measurements includes data having the modality of the first sensor and the modality of the second sensor, and has a resolution of the second sensor.

11. The method of claim 10, wherein the first sensor is a depth sensor and the second sensor is a camera.

* * * * *